United States Patent [19]

Valentine

[11] 4,429,905
[45] Feb. 7, 1984

[54] DUAL OPPOSED SEAL RING COUPLING
[75] Inventor: Gordon A. Valentine, Denver, Colo.
[73] Assignee: Stanley Aviation Corporation, Denver, Colo.
[21] Appl. No.: 335,362
[22] Filed: Dec. 29, 1981
[51] Int. Cl.³ .................. F16L 35/00; F16L 19/08; F16L 23/00
[52] U.S. Cl. .................................. 285/93; 285/340; 285/331; 285/363; 285/DIG. 18
[58] Field of Search ............... 285/93, 363, 331, 339, 285/340, DIG. 18

[56] References Cited
U.S. PATENT DOCUMENTS 2,202,492  5/1940  Jacocks ..................... 285/340
2,457,077  12/1948  Woolsey ..................... 285/340
2,459,608  1/1949  Woolfram ................... 285/340
3,058,762  10/1962  Howe ........................ 285/340
3,625,552  12/1971  Mahoff ................... 285/340 X
3,884,511  5/1975  Hermanson ................... 285/93
4,288,105  9/1981  Press ...................... 285/93 X Primary Examiner—Richard J. Scanlan, Jr.
Attorney, Agent, or Firm—LeBlanc, Nolan, Shur & Nies

[57] ABSTRACT

A fluid-conveying coupling assembly in which a pair of torsionally deflectable seal rings establish a redundant seal between interconnected coupling structures and in which the seal rings are oriented and deflected in such a manner that they impose non-cumulative radially directed forces on the interconnected structures.

11 Claims, 5 Drawing Figures

DUAL OPPOSED SEAL RING COUPLING

FIELD OF INVENTION

This invention relates to fluid-conveying couplings and other assemblies having a plurality of torsionally deflectable seal rings for establishing a fluid-tight seal between the interconnected, fluid-conveying parts. In particular, the present invention constitutes an improvement over the dual seal ring arrangement shown in FIG. 4 of U.S. Pat. No. 3,625,552 which issued to George A. Mahoff on Dec. 7, 1971.

BACKGROUND

The dual seal ring arrangement in FIG. 4 of the Mahoff patent advantageously provides a redundant seal whereby should one of the seal rings fail, the other will maintain a seal between the coupling members. Mahoff's redundant seal ring arrangement, however, has the undesirable effect of reducing the interference which is required between each seal ring and the coupling members for establishing a tight seal.

In the Mahoff coupling, the seal rings are torsionally deflected to their seal-establishing conditions by engaging the seal rings with formations on the coupling members and by axially drawing the coupling members together. Upon being torsionally deflected, each seal ring will be deformed into a cone-shaped configuration in which the seal ring's radial dimension is increased, thereby creating the required interference or sealing pressure for establishing the fluid-tight seal.

Because of the arrangement of the Mahoff seal rings with the coupling members, the radial forces exerted by the seal rings on each coupling member will be in the same direction. These seal ring-exerted forces will therefore be cumulative and will have the undesirable effect of radially deflecting the seal ring-engaging portions of the coupling members away from each other to reduce the tightness of the seal between the coupling members.

The effect of the cumulative radial forces on the coupling members in the Mahoff coupling is normally not a significant problem in small couplings because of the relatively high radial stiffness of the coupling members. However, in large couplings having tube sizes greater than three inches, the radial stiffness of the coupling members is reduced to such an extent that it is insufficient to prevent the coupling members from being radially deflected to a substantial degree under the influence of the cumulative seal ring-exerted forces. For large coupling sizes, the sealing pressure is therefore reduced to a level that is often too low for establishing a satisfactory seal.

The present invention overcomes the foregoing problem but retains the advantage of the dual seal ring redundancy.

SUMMARY AND OBJECTS OF INVENTION

In the redundant seal ring coupling of this invention, the two seal rings exert non-cumulative radial forces on the coupling members, rather than cumulative forces, with the result that a higher degree of sealing pressure is established as compared with the Mahoff dual seal ring coupling. This is accomplished by an arrangement in which one coupling member engages an outer peripheral corner edge of a first seal ring and an inner peripheral corner edge of a second seal ring and in which the other coupling member engages an inner peripheral corner edge of the first seal ring and an outer peripheral corner edge of the second seal ring. The arrangement is such that the two seal rings will be torsionally deflected in opposite directions as the coupling members are drawn axially together. With this unique arrangement, the radial forces exerted by the seal rings on each coupling member will be oppositely acting and therefore non-cumulative.

In the comparison to the present invention, Mahoff's dual seal ring coupling is constructed in such a way that one coupling member engages outer corner edges of both seal rings while the other coupling member engages inner corner edges of both seal rings to torsionally deflect both seal rings in a common direction and to create a force pattern in which the radial forces imposed on each coupling member cumulatively act in a common direction.

With the foregoing in mind, the general aim and purpose of the present invention is to provide a novel redundant seal ring coupling assembly which overcomes the previously described problem of the Mahoff seal ring assembly.

A more specific object of this invention is to provide a novel dual torsionally deflectable seal ring coupling assembly wherein non-cumulative radially directed forces are exerted by the seal rings on the coupling members or other structures.

Further objects of this invention will appear as the description proceeds in connection with the below-described drawings and the appended claims.

DETAILED DESCRIPTION

Figure 1:
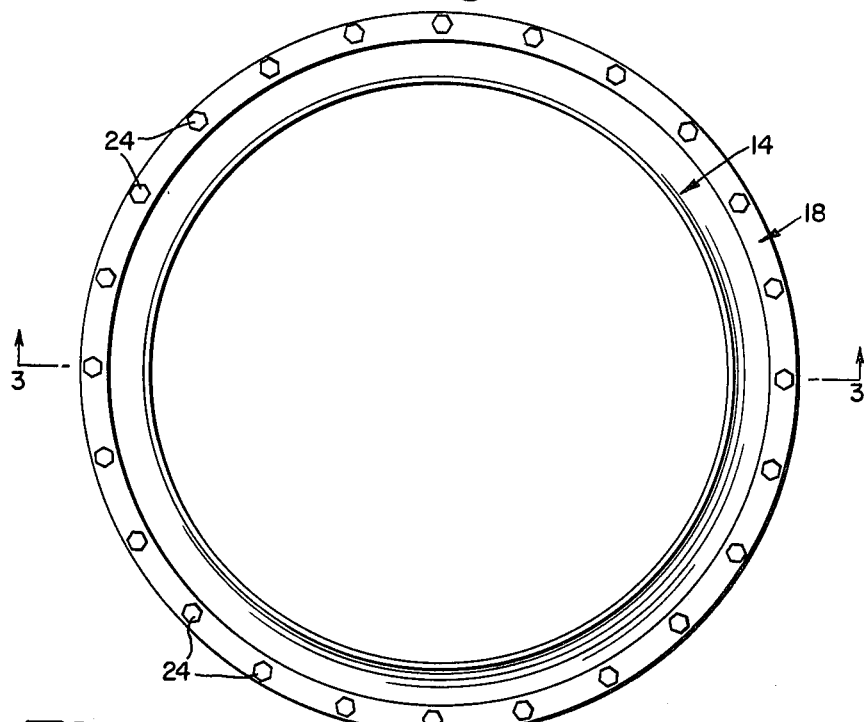
FIG. 1 is an end view of a coupling assembly incorporating the principles of this invention.
Figure 2:
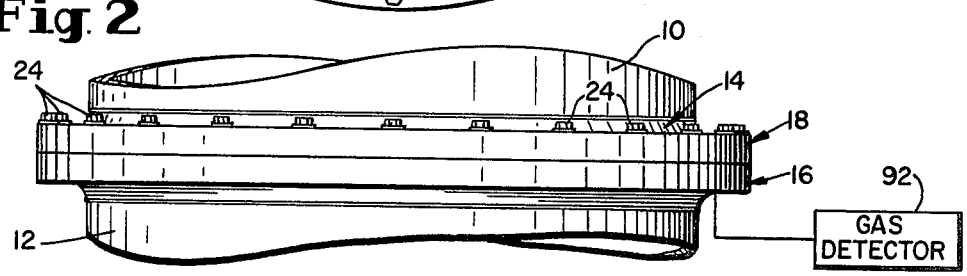
FIG. 2 is a plan view of the coupling assembly shown in FIG. 1.
Figure 3:
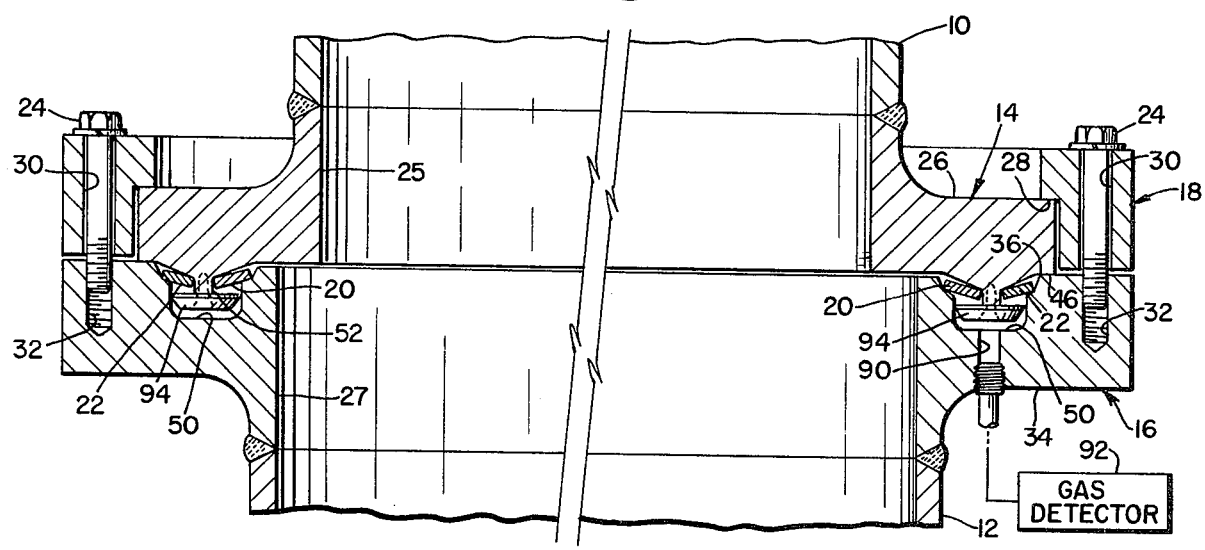
FIG. 3 is a section taken substantially along lines 3—3 of FIG. 1.

Referring to FIGS. 1–3 of the drawings, the coupling assembly incorporating the principles of this invention is used to couple together a pair of tubular fluid-conveying pipes or conduits 10 and 12 and mainly comprises a pair of axially aligned coupling members or flanges 14 and 16, a coupler ring 18, and a pair of torsionally deflectable seal rings 20 and 22. Flange 14 is welded or otherwise suitably fixed to conduit 10, and flange 16 is similarly welded or otherwise suitably fixed to conduit 12. Flanges 14 and 16 axially confront each other and are detachably coupled together by coupler ring 18 and a multiplicity of angularly spaced apart bolts 24.

In the illustrated embodiment, coupling flanges 14 and 16 are annular and are formed with uniformly diametered through passages 25 and 27, respectively, to establish fluid communication between pipes 10 and 12. It will be appreciated, however, that the coupling flanges, seal rings and coupler ring may alternatively be rectangular or some other non-circular shape.

Coupler ring 18 coaxially and peripherally surrounds a radially extending portion 26 of flange 14 and is formed with a radially inwardly extending lip 28 which seats against the side of flange portion 26 which faces axially away from flange 16. Bolts 24 extend through parallel, smooth walled bores 30 in ring 18 and are threaded into tapped bores 32 in a radially extending portion 34 of flange 16. Flange 14 is clamped and axially confined between the coupler ring's lip portion 28 and an opposing end face 36 of flange 16.

Figure 4:
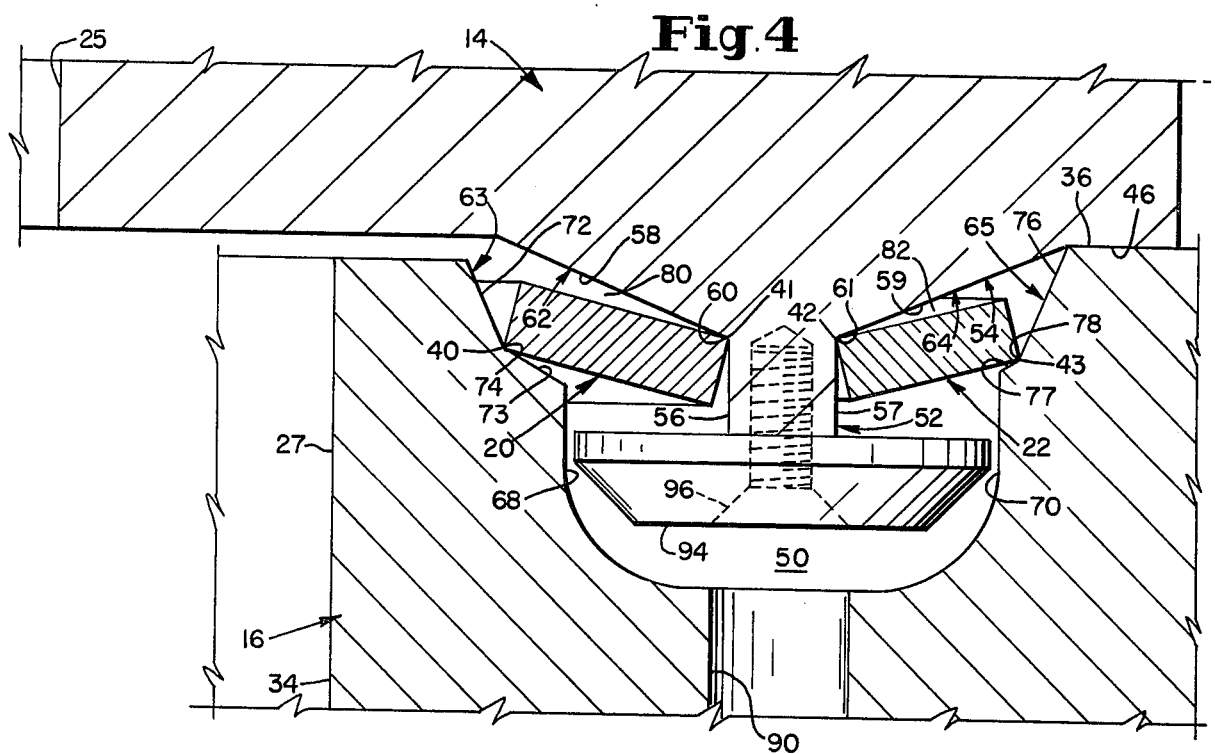
FIG. 4 is an enlarged fragmentary view of the sectioned coupling shown in FIG. 3 to illustrate the dual opposed seal ring assembly in greater detail.

As best shown in FIGS. 3 and 4, each of the seal rings 20 and 22 is of the same construction as that disclosed in the previously identified Mahoff U.S. Pat. No. 3,625,552. Seal ring 20 is thus formed with a rectangular cross section to define a pair of circumferentially extending, diagonally opposite corner edges 40 and 41, and seal ring 22 is likewise formed with a rectangular cross section to also define a pair of circumferentially extending diagonally opposite corner edges 42 and 43. The disclosure of the Mahoff U.S. Pat. No. 3,625,552 is hereby incorporated into this specification by reference. As disclosed in the Mahoff patent, each of the torsionally deflectable seal rings is formed from a suitable metal which is resilient and preferably somewhat ductile. In the illustrated embodiment, seal rings 20 and 22 have different diameters, are concentrically arranged and are radially spaced apart from each other.

As best shown in FIG. 3, coupling flange 14 is formed with an annular, flat, radially extending end face 46 which confronts and overlaps with the end face 36 of coupling flange 16. Coupling flange 16, which may be considered as the female coupling member in the illustrated embodiment, is formed with a generally annular recess or groove 50 which coaxially surrounds the flange's fluid-conveying passage 27 and which opens towards flange 14 at the flange's end face 36. Coupling flange 14, which may be considered as the male coupling member in the illustrated embodiment, is integrally formed with an annular lip 52 which is coaxial with the flanges' flow passages 25 and 27 and which protrudes axially beyond end face 46 and into recess 50. Lip portion 52 is integrally joined to flange portion 26 by an intermediate circumferentially extending portion 54 which has a conical configuration in cross section. The conically contoured portion 54 is received in the mouth of recess 50 and coaxially surrounds the aligned longitudinal axes of flanges 14 and 16. The lip and intermediate portions 52 and 54 are spaced radially outwardly from flow passage 25.

As best shown in FIG. 4, lip portion 52 is formed with inner and outer oppositely facing, smooth, uniformly diametered, cylindrical peripheral surfaces 56 and 57. Portion 54 is formed with inner and outer endless circumferentially extending conically contoured surfaces 58 and 59, each lying in a conical envelope. In cross section, the conically contoured surfaces 58 and 59 are oppositely sloped so that the conical envelopes containing these surfaces are oppositely facing and have their apexes lying along the longitudinal axis of coupling flange 14.

The cylindrical surface 56 is contiguous with and intersects the conically contoured surface 58 at an obtuse angle to form a circumferentially extending corner 60 for receiving the outer corner edge 41 of seal ring 20. Cylindrical surfaces 57 is contiguous with and intersects the conically contoured surface 59 at an obtuse angle to form another circumferentially extending corner 61 for receiving the inner circumferentially extending corner 42 of seal ring 22. Corners 60 and 61 are oppositely facing.

Cylindrical surface 56 thus cooperates with the conically contoured surface 58 to define an outer circumferentially extending formation 62 for engaging seal ring 20. Formation 62 cooperates with an inner circumferentially extending formation 63 (to be described in detail later) for torsionally deflecting seal ring 20 to its seal-establishing condition.

The cylindrical surface 57 and the conically contoured surface 59 coact to define a further circumferentially extending formation 64 for engaging seal ring 22. Formation 64 cooperates with another circumferentially extending seal ring engaging formation 65 (to be described later) for torsionally deflecting seal ring 22 to its seal-establishing condition.

As best shown in FIG. 4, the seal ring-engaging formations 63 and 65 are integrally formed on coupling flange 16. Formation 63 is formed at the mouth of recess 50 and defines the outer portion of the recess' inner side wall 68. Formation 65, which is also formed at the mouth of recess 50, lies in opposing relationship to formation 63 and defines the outer portion of the recess' outer side wall 70. By virtue of the configurations of formations 63 and 65, the mouth of recess 50 is outwardly flared as shown.

Still referring to FIG. 4, the seal ring-engaging formation 63 is defined by a pair of contiguous, circumferentially extending, conically contoured surfaces 72 and 73 which are provided with different slopes and which intersect with each other at an obtuse angle to define a further circumferentially extending corner 74 for receiving the inner circumferentially extending corner edge 40 of seal ring 20. As shown, surfaces 72 and 73 are contained in separate conical envelopes having their apexes lying along the longitudinal axis of coupling flange 16.

Similar to formation 63, formation 65 is also defined by a pair of contiguous, conically contoured, circumferentially extending surfaces 76 and 77 which are provided with different slopes and which intersect with each other to define a further circumferentially extending corner 78 for receiving the outer circumferentially extending corner edge 43 of seal ring 22. Surfaces 76 and 77 are contained in separate conical envelopes having their apexes lying along the longitudinal axis of coupling flange 16.

Corners 60 and 74 open diagonally toward each other. Likewise, corners 61 and 78 open diagonally toward each other.

Still referring to FIG. 4, the lip portion 52 of coupling flange 14 is centrally received in recess 50 so that it lies midway between the recess' side wall 68 and 70 and therefore is equally spaced from side wall 68 and 70. In the assembled position of parts shown in FIGS. 3 and 4, formations 62 and 63 cooperate with each other to define a circumferentially extending cavity 80 which receives seal ring 20. Similarly, formations 64 and 65 cooperate to define another circumferentially extending cavity 82 which receives seal ring 22.

Cavities 80 and 82 are radially spaced apart from each other and are concentrically arranged. Cavities 80 and 82 are coaxial with the aligned axes of coupling flanges 14 and 16.

In the fully assembled, seal-establishing arrangement of parts as shown in FIGS. 3 and 4, lip portion 52 extends coaxially between seal rings 20 and 22 such that seal ring 20 is disposed on the inner peripheral side of lip portion 52 while seal ring 22 is disposed on the outer peripheral side of lip portion 52. In the seal-establishing assembly of parts shown in FIGS. 3 and 4, the diagonally opposite corner edges 40 and 41 of seal ring 20 are seated in corners 74 and 60, respectively, and the diagonally opposite corner edges 42 and 43 of seal ring 22 are seated in corners 61 and 78, respectively.

Figure 5:
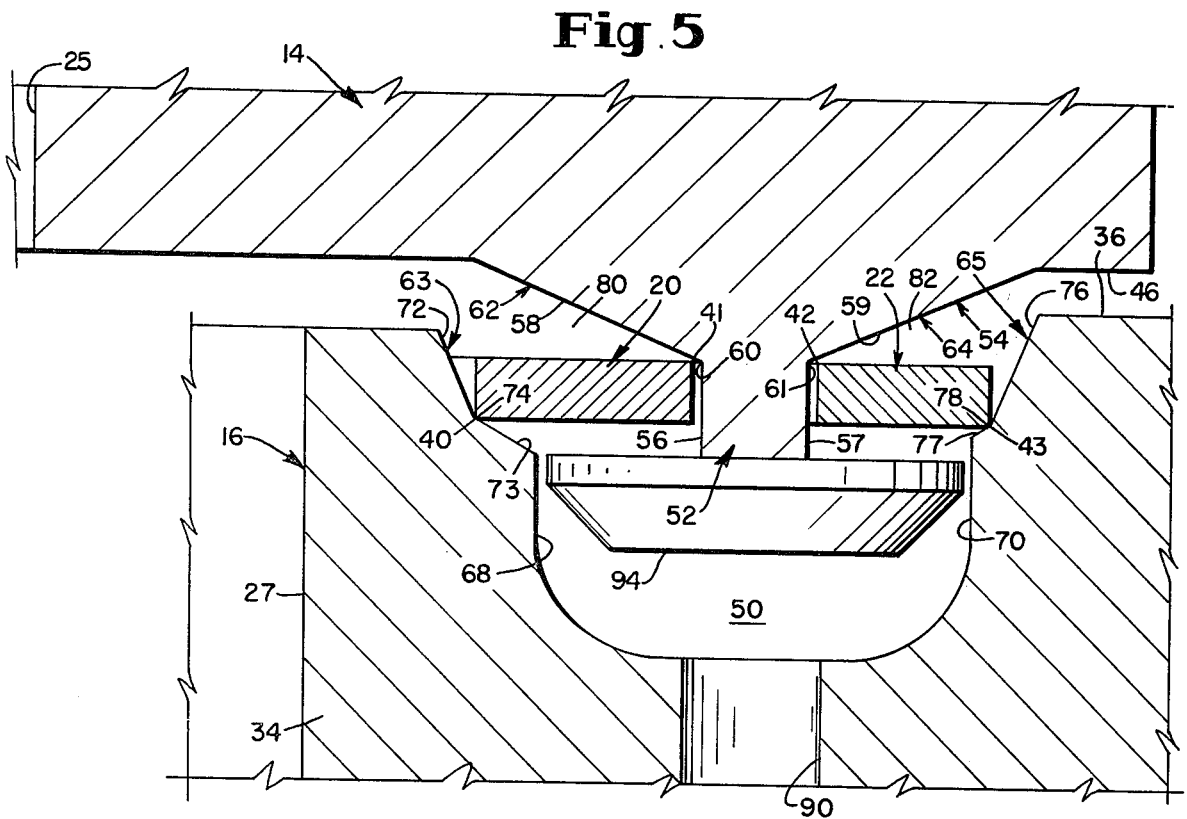
FIG. 5 is a sectioned fragmentary view similar to FIG. 4 but showing the coupling assembly in partially assembled form where the seal rings are still in their relaxed, undeflected conditions.

For assembling the parts of the coupling assembly and establishing the fluid tight seal with seal rings 20 and 22, coupling flanges 14 and 16 are axially aligned at positions shown in FIG. 5 where their end faces 46 and 36 confront each other and where the annular lip 52 registers or aligns with recess 50 and extends between seal rings 20 and 22 which are in their relaxed, undeflected conditions in the mouth of recess 50. Coupling ring 18 is assembled on coupling flange 14 to engage the backside of coupling flange 14, and bolts 24 are tightened to axially draw coupling flanges 14 and 16 together. In their relaxed, undeflected conditions as shown in FIG. 5, the cross sections of seal rings 20 and 22 will each have an undistorted rectangular configuration. Furthermore, the flat, oppositely facing end faces of each of the seal rings 20 and 22 will lie in parallel planes when the seal ring is in its undeflected condition as shown in FIG. 5.

As the coupling flanges 14 and 16 are axially drawn together from the positions of parts shown in FIG. 5, formations 62 and 63 will both engage seal ring 20 and, at the same time, formations 64 and 65 will both engage seal ring 22. Engagement of seal ring 20 with formations 62 and 63 applies a force couple to seal ring 20 to initiate the torsional deflection of seal ring 20 and to urge seal ring 20 into a position where its diagonally opposite corner edges 40 and 41 seat in corners 74 and 60, respectively. Likewise, engagement of seal ring 22 with formations 64 and 65 applies a force couple to seal ring 22 to initiate the torsional deflection of seal ring 22 and to urge seal ring 22 into a position where its diagonally opposite corner edges 42 and 43 seat in corners 61 and 78, respectively. Thereafter, continued relative axial displacement of coupling flanges 14 and 16 toward each other fully torsionally deflects seal rings 20 and 22 to their sealestablishing condition shown in FIG. 4. Axial displacement of coupling flanges 14 and 16 toward each other is limited by seating engagement of the flange end face 46 with the flange end face 36.

Upon being fully torsionally deflected in the manner shown in FIG. 4, each of the seal rings 20 and 22 will be deformed to a cone-shaped configuration in which the radial dimension of each seal ring is increased to cause the interference that produces the fluid tight seal between coupling flanges 14 and 16. It will be appreciated that the torsional deflection of each of the seal rings 20 and 22 is brought about by the force couple mentioned above which effectively pivots or rotates the seal ring's cross section about a center lying on the cross section. Seal ring 20 will therefore be radially, compressively loaded at its diagonally opposite corner edges 40 and 41, and seal ring 22 will likewise be radially, compressively loaded at its diagonally opposite corner edges 42, 43.

In the torsionally deflected condition of seal ring 20 as shown in FIG. 4, a first sealing interface is established at the line of contact between the seal ring's corner edge 40 and corner 74, and a second sealing interface is established at the line of contact between the seal ring's corner edge 41 and corner 60. In its torsionally deflected condition shown in FIG. 4, seal ring 22 also establishes two sealing interfaces, one being established at the line of contact between corner edge 42 and corner 61, and the other being established at the line of contact between corner edge 43 and corner 78.

In FIG. 4, it will be observed that seal ring 20 engages formations 63 and 62 only at corners 74 and 60. Similarly, seal ring 22 engages formations 64 and 65 only at corners 61 and 78. Depending upon the dimensions of the component parts in the coupling assembly, each of the seal rings 20 and 22 may be torsionally deflected to a further extent where its oppositely directed end faces seat against the opposing conically contoured surfaces of its associated seal ring-engaging formations as shown, for example, in FIG. 3 of the Mahoff patent, but such additional torsional deflection of the seal ring is unnecessary for establishing the fluid tight seal between coupling flanges 14 and 16.

From FIG. 3 it will be observed that a first radially extending plane normally intersecting the aligned axes of coupling flanges 14 and 16 passes through the seal ring-engaging corners 60 and 61 and hence through the engaged corner edges 41 and 42 of seal rings 20 and 22, respectively. Similarly, a second radially extending plane normally intersecting the aligned axes of coupling flanges 14 and 16 and extending parallel to the first plane mentioned above passes through the seal ring-engaging corners 74 and 78 and hence through the corner edges 40 and 43 of seal rings 20 and 22, respectively.

From the description thus far, it will be appreciated that seal rings 20 and 22 will be torsionally deflected about their cross sections in opposite directions. It also will be appreciated that each of the coupling flanges 14 and 16 is engaged by the outer periphery of only one of the seal rings and further that each of the coupling flanges is engaged by the inner periphery of only one of the seal rings. This unique arrangement creates a force pattern in which the torsionally deflected seal rings apply non-cumulative, opposite radial forces to each of the coupling flanges 14 and 16. In the case of coupling flange 14 the radial forces are counterbalancing. In the case of coupling flange 16 the radial forces act away from each other tending to spread the mouth of recess 50, but these radially directed forces will be reacted locally in the confined region of recess 50 and over a relatively short radial distance extending between corners 74 and 78 where coupling flange 16 is relatively stiff to thus adequately resist the radial deflection of formations 63 and 65 away from each other. The sealing pressure or interference required for establishing a tight seal therefore will not be impaired notwithstanding the use of two rings to achieve a redundant sealing action.

It will be observed that seal rings 20 and 22 are serially spaced apart along the fluid leak path which extends along the interface between coupling flanges 14 and 16. Seal ring 20 acts as the primary seal while seal ring 22 acts as a backup to provide the redundant sealing action in which seal ring 22 tends to block any leakage past seal ring 20 and operates as the primary seal if seal ring 20 fails.

In the illustrated embodiment, a bore 90 is formed through the radially extending portion 34 of flange 16 and opens into recess 50 at a region lying between seal rings 20 and 22. A detector 92 is optionally connected to bore 90 and may be of any suitable type for detecting fluid in the region of recess 50 which lies between seal rings 20 and 22 to thus detect leakage past seal ring 20. Detector 92, for example, may be a simple sensor for sensing the presence of gas. Alternatively, it may be a pressure indicating device for monitoring the pressure in recess 50.

In the illustrated embodiment a plurality of washers 94 are optionally fixed to the flat end face of lip portion 52 by screws 96. Washers 94 are equiangularly spaced apart and serve as guides for seal rings 20 and 22 during assembly of the coupling flanges. Washers 94 also serve to engage and forcibly dislodge seal rings 20 and 22 from coupling flange 16 upon disconnecting the coupling flanges.

Reference to the coupling flanges or other fluid-conveying structures as being "tubular" is intended to cover both circular and non-circular (e.g., rectangular) configurations.

The invention may be embodied in other specific forms without departing from the spirit or essential characteristics thereof. The present embodiment is therefore to be considered in all respects as illustrative and not restrictive, the scope of the invention indicated by the appended claims rather than by the foregoing description, and all changes which come within the meaning and range of equivalency of the claims are therefore intended to be embraced therein.

What is claimed and desired to be secured by Letters Patent is:

1. In a coupling assembly, first and second tubular fluid passage-defining structures, means for relatively drawing said structures axially together to assemble said structures in coupled relation to each other, said structures defining therebetween first and second cavities each extending circumferentially around the longitudinal axes of said structures, first and second seal rings each received in a separate one of said cavities and each being torsionally deflectable about its cross section to a condition in which it establishes a substantially fluid tight seal between said structures, and coacting means on said first and second structures for engaging said seal rings and torsionally deflecting said seal rings about their cross sections as said structures are drawn axially together, said seal rings engaging said coacting means at locations where they impose non-cumulative radially directed forces on said structures upon being torsionally deflected to their sealestablishing conditions.

2. The coupling assembly defined in claim 1 wherein said first structure engages an outer peripheral region of only said first seal ring and an inner peripheral region of only said second seal ring, and wherein said second structure engages an outer peripheral region of only said second seal ring and an inner peripheral region of only said first seal ring.

3. The coupling assembly defined in claim 1 wherein each of said structures is formed with a fluid flow passage to provide for the flow of fluid through the assembly of said first and second structures, wherein said cavities are disposed radially outwardly of the fluid flow passages of said structures and circumferentially surround said passages, and wherein said cavities are radially spaced apart from each other and are axially overlapping.

4. The coupling assembly defined in any one of the preceding claims 1–3 wherein said coacting means comprises first, second, third and fourth corners extending circumferentially around the longitudinal axes of said structures, said first and second corners delimiting said first cavity, and said third and fourth corners delimiting said second cavity, said second and third corners being formed on said first structure and said first and fourth corners being formed on said second structure, said first seal ring being formed with a pair of diagonally opposite corner edges, said structures engaging said first seal ring at said corner edges of said first seal ring as said structures are drawn axially together to seat said corner edges of said first seal ring in said first and second corners to effectuate the torsional deflection of said first seal ring for compressively radially loading said first seal ring at said corner edges of said first seal ring, said second seal ring being formed with a pair of diagonally opposite corner edges, said structures engaging said second seal ring at said corner edges of said second seal ring to seat said corner edges of said second seal ring in said third and fourth corners to effectuate the torsional deflection of said second seal ring for compressively radially loading said second seal ring at said corner edges of said second seal ring.

5. The coupling assembly defined in any one of the preceding claims 1–3 wherein said coacting means comprises first, second, third and fourth formations, said second and third formations being formed on said first structure and said first and fourth formations being formed on said second structure, said first and second formations delimiting said first cavity and engaging said first seal ring to torsionally deflect said first seal ring, and said third and fourth formations delimiting said second cavity and engaging said second seal ring to torsionally deflect said second seal ring.

6. The coupling assembly defined in claim 1 wherein each of said structures is formed with a fluid flow passage, the fluid flow passages of said structures opening into each other to provide for the flow of fluid through the assembly of said first and second structures, said second structure being formed with a recess opening axially toward said first structure and having radially spaced apart side walls, said recess being spaced radially outwardly of and peripherally surrounding the fluid flow passage of said second structure, said first structure being formed with a portion extending axially into said recess and peripherally surrounding the longitudinal axes of said structures, and said coacting means comprising first, second, third and fourth formations, said first formation forming a part of one of said side walls, said fourth formation forming a part of the other of said side walls, said second and third formations being formed on said portion of said first structure, said first seal ring having a pair of diagonally opposite corner edges, said first and second formations delimiting said first cavity and engaging said corner edges of said first seal ring as said structures are drawn axially together to effectuate the torsional deflection of said first seal ring about its cross section, said second seal ring being formed with a pair of diagonally opposite corner edges, and said third and fourth formations delimiting said second cavity and engaging said diagonally opposite corner edges of said second seal ring as said structures are drawn axially together to effectuate the torsional deflection of said second seal ring about its cross section.

7. The coupling assembly defined in claim 6 wherein said first seal ring is torsionally deflected in a preselected direction by said first and second formations, and wherein said second seal ring is torsionally deflected by said third and fourth formations in a direction opposite to said pre-selected direction.

8. The coupling assembly defined in claim 7 wherein said seal rings are radially spaced apart from each other, and wherein said portion of said first structure extends between said seal rings.

9. The coupling assembly defined in claim 6 wherein said first seal ring lies radially inwardly of said second seal ring to provide a primary seal for preventing fluid in said fluid flow passages from leaking outwardly along a path extending between said structures, and wherein said second seal ring is disposed along said path to provide a seal for blocking leakage of fluid past said first seal ring.

10. The coupling assembly defined in claim 9 wherein said second structure is formed with a further passage communicating with a region of said recess which lies between said seal rings, there being means connected to said further passage for detecting the presence of gas leakage into said region of said recess.

11. In a coupling assembly, first and second tubular fluid flow passage-defining structures, means for relatively drawing said structures axially together to assemble said structures in coupled relation to each other, said structures defining therebetween first and second cavities each extending circumferentially around the longitudinal axes of said structures, first and second seal rings each received in a separate one of said cavities and each being torsionally deflectable about its cross section to a condition in which it establishes a substantially fluid tight seal between said structures, said seal rings being serially arranged along a common fluid leakage path which extends along the interface between said structures such that the seal established by each of said seal rings blocks leakage of fluid along said path, and coacting formations on said first and second structures for torsionally deflecting said seal rings in opposite directions about their cross sections.

* * * * *